United States Patent [19]

Kawahara

[11] Patent Number: 4,777,417
[45] Date of Patent: Oct. 11, 1988

[54] HEAD POSITION CONTROL SYSTEM FOR A DISC STORAGE UNIT

[75] Inventor: Yuji Kawahara, Kawasaki, Japan

[73] Assignee: Fuji Electric Company, Ltd., Kawasaki, Japan

[21] Appl. No.: 71,326

[22] Filed: Jul. 9, 1987

[30] Foreign Application Priority Data

Jul. 16, 1986 [JP] Japan .................. 61-167455

[51] Int. Cl.$^4$ ............................. G05B 19/29
[52] U.S. Cl. ........................ 318/602; 318/696; 318/685; 318/772; 360/74.4; 360/77; 360/78
[58] Field of Search ............... 318/696, 685, 772, 362, 318/436; 360/74.4, 77, 78

[56] References Cited

U.S. PATENT DOCUMENTS 4,486,699 12/1984 Hoemann et al. ............ 318/772
4,518,904 5/1985 MacLeod et al. ............ 318/685

Primary Examiner—William M. Shoop, Jr.
Assistant Examiner—Saul M. Bergmann
Attorney, Agent, or Firm—Spencer & Frank

[57] ABSTRACT

Lead wires are extended from phase coils of a head control motor, so that their effective reactances may be varied, and reactance selection circuits are additionally provided to switch values of the reactances of the phase coils to a low value. A vector position is sequentially delivered to phase current generators by a processor for designating the vector position, so that a head is displaced to a desired position. Thereafter, the reactances of the phase coils are switched to a high value by the reactance selection circuits, and then the vector position corresponding to the normal one is applied to the phase current generators, so that the head is so controlled as to be positioned at its normal position on a track on a disc and is maintained at this position. During the time of displacement of the head across the tracks, it is ensured that the head control motor is driven at a high response speed.

5 Claims, 5 Drawing Sheets

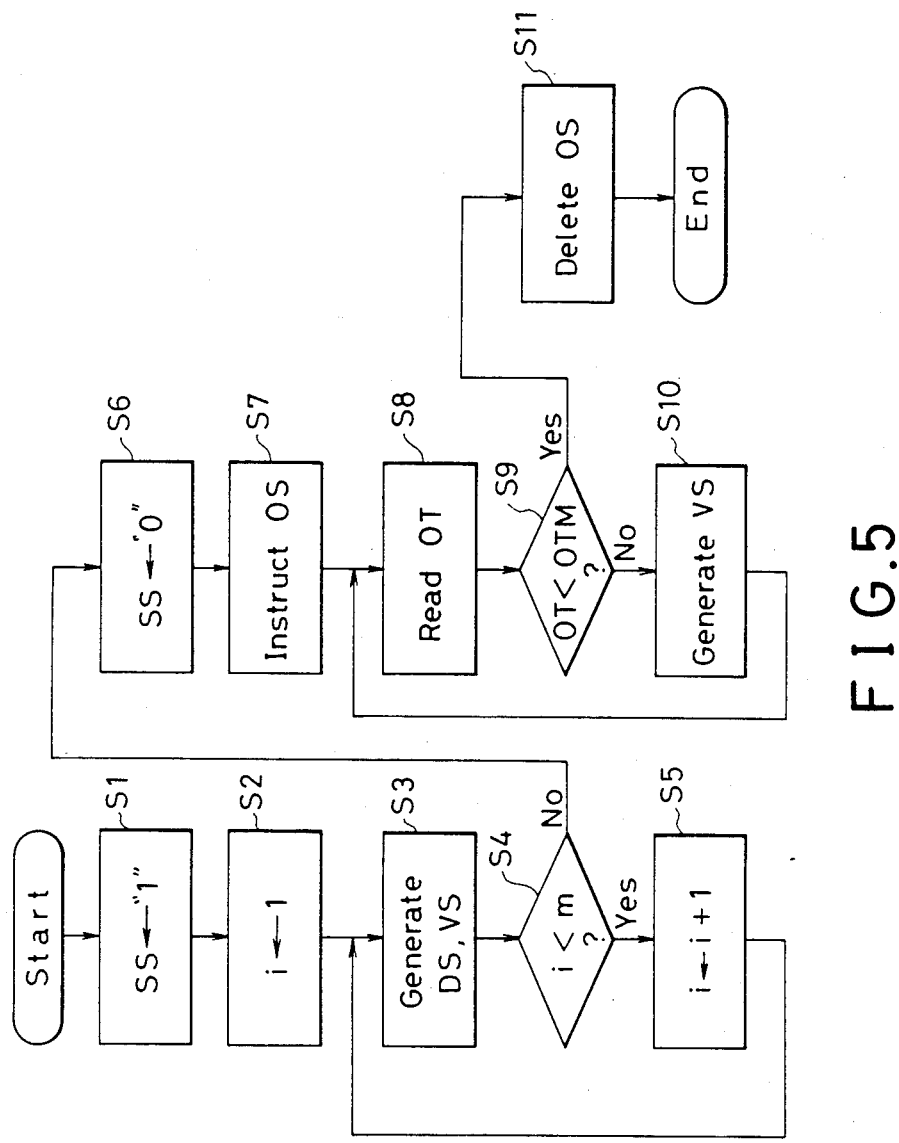
F I G. 5

HEAD POSITION CONTROL SYSTEM FOR A DISC STORAGE UNIT

BACKGROUND OF THE INVENTION

1. Field of the Invention

The present invention relates to a head position control system for a disc storage unit such as a fixed disc unit for displacing an information read/write head by a head control motor, especially such as a stepping motor, to a desired position and thereafter positioning the write/read head at a normal position and maintaining the head at this normal position.

2. Description of the Prior Art

Recently, there has been remarkable progress in the development of disc storage units, so that even in a fixed disc unit which uses a disc of 3.5 inches in diameter it is usual that the disc unit has a storage capacity of several tens megabits. In spite of the remarkable progress in storage capacity, the access time from a computer to desired information stored in a disc storage unit is quite long, compared with the access time to a RAM or ROM within the computer. In fact, the displacement of the write/read head for writing or reading data into or from a disc must be carried out mechanically, so that its control or access time is naturally limited, unlike electronic operations within the computer. In practice, the actual mechanical access time is considerably longer than a minimum access time required for carrying out a complete mechanical operation, so that there exists still room for shortening the access time.

In this case, there exists a contradictory problem when the access time is shortened while the data storage density is increased. More particularly, when a large number of tracks are defined on one major surface of a disc, even a very small error of the head position in the radial direction of the disc results in erroneous writing or reading of data, so that the head must be correctly controlled to be positioned at a normal position of any desired track. Therefore, the position of the head is controlled by a closed loop system in such a way that so-called servo information which is recorded on one major surface of a disc is read out by the head. In response to the servo information thus read out by the head, an offtrack amount of the head from its normal position is detected and the position of the head is so controlled that the off-track amount becomes zero.

In order to bring the head to a selected track at which desired information is written or read out, the head must be displaced from a certain track to the selected track. In this case, an open loop control system is used to control the position of the write/read head.

In practice, after the open loop control has been accomplished, the above-mentioned closed loop control is carried out. In any case, two different control systems are used, so that the control characteristics are different from each other and consequently a contradictory and unreasonable position control tends to occur. As a result, it may happen that the position control cannot be carried out as originally intended, so that in many cases an erroneous position control occurs, and consequently an unexpectedly long time period is required to correct such erroneous position control.

The above and other problems encountered in the conventional head position control system will be described in more detail with reference to FIGS. 6A–6E.

In the head position control, the direct object to be controlled is a head control motor which is mechanically coupled to the head. In general, a two-phase motor or more specifically a so-called stepping motor is used as the head position control motor. FIG. 6A shows waveforms of two phase currents Ia and Ib in case of the open loop control. The waveforms are so illustrated to correspond to the positions of composite phase current vectors in an electrical angle diagram shown in FIG. 6B. In FIG. 6B, eight reference vector positions are represented by numerals 0–7, respectively, which are also shown in the upper portion of FIG. 6A.

As is readily understood by those skilled in the art, ideal waveforms of the phase currents Ia and Ib change as illustrated by the broken lines in FIG. 6A, but in practice, because the phase coils of the head control motor have reactance, the actual phase currents Ia and Ib have waveforms illustrated by the solid lines in FIG. 6A which tend to lag behind the ideal waveforms. In this case, while the practical waveforms are quite complicated, relatively simplified waveforms are shown in FIG. 6A for the sake of simplicity. It is seen from FIG. 6A that the waveforms of the phase current Ia at, for instance, the vector positions 0 and 4 are considerably different from the ideal waveforms.

In the case of the open loop control described above, the velocity v of the write/read head or the velocity of the control motor is not maintained constant, but is varied in the form of a trapezoid or a triangle with respect to time t as shown in FIG. 6C or 6D, so that the head can be displaced by a predetermined distance in the shortest time period. It is apparent that FIG. 6C shows the case in which the displacement of the head is greater, while FIG. 6D shows the case in which the displacement of the head is shorter. The waveforms as shown in FIG. 6A are obtained on the upper flat side of the trapezoid shown in FIG. 6C. When the velocity v rises or falls, the time interval corresponding to a certain vector position becomes shorter than the time interval shown in FIG. 6A, so that the rise or fall of the velocity v is further influenced by reactance. In this case, if the repetition period of the phase current pulses as shown in FIG. 6A is shortened, in order to increase the displacement velocity of the head control motor, the driving torque is decreased and in the worst case, the head control motor would not respond to the given phase current pulses.

The position at which the head stops after the completion of the open loop control period is not necessarily the normal position of a selected track, and it frequently happens that the head stops at a position with a so-called off-track amount. Therefore, as shown by the broken-line arrow in FIG. 6B, it is required that the vector position applied to the head control motor be slightly shifted from the above-mentioned typical reference vector position, for instance, the vector position 0. To this end, the correction of the head position is carried out by closed loop control. In this case, a phase current having a current value which is more accurately determined than the phase current command value for the reference vector position in case of open loop control must be applied to the head control motor. The phase current is modulated, for instance, by pulse width moduration (PWM) as shown in FIG. 6E. More particularly, a predetermined time period is divided into, for instance, 16 periods as shown in such a way that the "ON" time becomes an integral multiple of a divided time period to correctly designate the phase current I. However, such a PWM phase current essentially has a repetitive pulse waveform, which is not necessarily adapted to be applied to the head control motor. However, in this case, the reactance of the phase coil serves to smooth the PWM phase current having the repetitive pulse waveform. Therefore, as is apparent from the above description, it is necessary that the reactance of each phase coil of the head control motor has a small value in the case of open loop control, whereas it is preferable that the reactance is rather large in the case of closed loop control.

After the head has been corrected to be brought to its normal position, the phase current having a correct current value as described above must be applied to the head control motor, so that data is written or read out while the head is maintained at the normal position. In this case, the head control motor functions not as a drive motor but as a kind of torque motor. During writing or reading data into or from a disc, it is important to apply a sufficient holding torque to the head control motor so that the head is prevented from being deviated from its normal position due to external causes such as vibrations. Of course, the holding torque of the head control motor is determined by the product of the phase current and the number of turns on the phase coil, but there arises a difficulty that if the reactance of each phase coil is decreased so as to improve the response time in the open loop control, the number of turns of each phase coil must be decreased so that the holding torque becomes insufficient to maintain the head at its normal position. Of course, it may be considered to increase the magnitude of the phase current while maintaining the head at its normal position. This method, however, naturally will increase the current consumption and hence the power consumption of the motor. In addition, the head control motor will be overloaded, so that this method is not satisfactory in practice.

SUMMARY OF THE INVENTION

In view of the above, it is an object of the present invention to provide a head position control system for a disc storage unit which exhibits a high-speed response of a head control motor for driving a read/write head and which provides a sufficient holding torque while the read/write head is maintained at its normal position.

In the first aspect of the present invention, a head position control system for a disc storage unit in which a read/write head reads out or writes information from or into a track of a plurality of tracks on a disc comprises:

a head control motor which is a poly-phase motor mechanically connected to the read/write head and having a lead wire extended from each of phase coils thereof and for switching the effective reactance thereof;

vector position designation means for designating the vector position of a composite vector on an electrical angle diagram defined by a plurality of phase currents flowing through the phase coils of the head control motor;

phase current generating means receiving a designation of the vector position from the vector position designation means and for outputting a plurality of phase currents having a current value corresponding to the designation;

reactance selection means receiving the phase currents from the phase current generating means and for selecting lead wires to which the phase currents are supplied to switch the effective reactances of the phase coils between a high reactance value and a low reactance value;

means for instructing the reactance selection means to switch the effective references;

means responsive to the instructing means for displacing the read/write head to a desired position by sequentially indicating the vector position by the vector position designation means when the effective reactances of the phase coils of the head control motor are selected to be a low value by the reactance selection means; and means for controlling the head so that the head is brought to and maintained at a normal position on a track of the disc by instructing a vector position corresponding to a normal position of a vector to the phase current generating means from the vector position designation means when the effective reactances of the phase coils are switched to a high value by the reactance selection means.

Here, the effective reactances of the phase coils may be switched to the high value, so that the ampere-turns defined by the phase currents are equal to or higher than the value of the ampere-turns in the case in which the effective reactances are low.

The lead wires may be intermediate tap lines of the phase coils. The intermediate tap lines may be center tap lines.

The reactance selection means may have two semiconductor switching circuits which comprise bridge connection diodes connected between an AC terminal pair of the bridge so as to flow the phase current therebetween and a transistor connected between a DC terminal pair of the bridge.

The above and other objects, effects, features and advantages of the present invention will become more apparent from the following description of embodiments thereof taken in conjunction with the accompanying drawings.

BRIEF DESCRIPTION OF THE DRAWINGS

FIG. 5 is a flowchart illustrating entire operations of the system in accordance with the present invention, which is viewed on the side of a processor as vector position designating means.

DETAILED DESCRIPTION OF PREFERRED EMBODIMENTS

Figure 1:
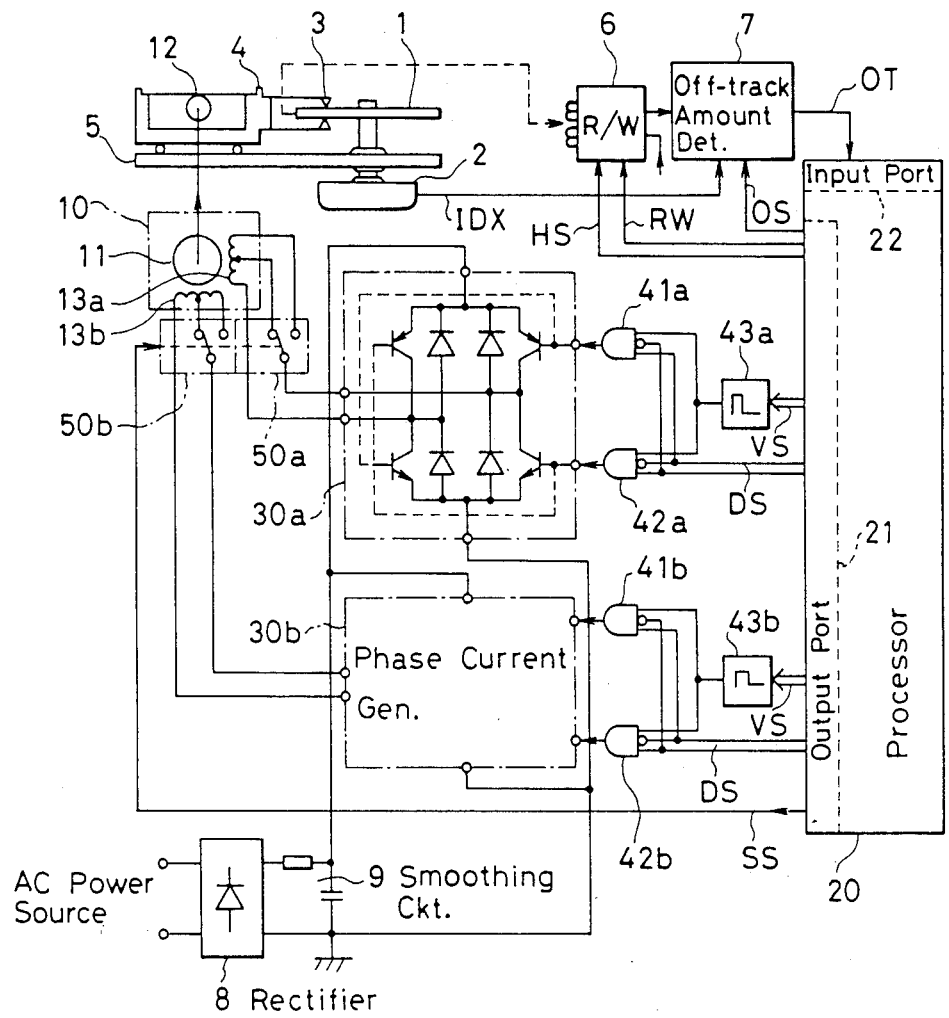
FIG. 1 is a circuit diagram showing a first embodiment of a head position control system for a disc storage unit in accordance with the present invention together with its peripheral mechanism and circuit.

FIG. 1 is a circuit diagram showing an embodiment of a head position control system in accordance with the present invention together with its associated mechanical portion and circuit.

A mechanical portion shown in a left upper portion is a fixed disc unit in which, as is well known to those skilled in the art, a disc 1 is rotated by a stepping motor 2 at a predetermined constant speed. Heads 3 for writing or reading out data into or from the disc 1 are mounted on a carriage 4 which in turn is movable in the rightward or leftward direction in FIG. 1 on a base 5 so that the heads 3 are brought to any desired position in the radial direction of the disc 1. The carriage 4 is securely mechanically joined to a capstan 12 directly connected to a rotor 11 of a head control motor 10, so that the carriage 4 is displaced in the manner described above in accordance with the clockwise or counterclockwise rotation of the motor 10.

A read/write circuit 6 shown on the right side of the mechanical portion in FIG. 1 is connected to the heads 3. In the read/write circuit 6, the head selected in accordance with the head selection command HS is switched to write or read mode in accordance with the read-/write command RW. An off-track amount detector 7, which is disposed on the right side of the read/write circuit 6, receives a readout signal from the read output terminal R of the read/write circuit 6 when servo information is read out from the disc 1 to detect an off-track amount of the head 3 from its normal position on the disc 1 in synchronism with index pulses generated in synchronism with the rotation of the disc 1 driven by the stepping motor 2.

The head control motor shown in FIG. 1 is a polyphase motor in the form of a two-phase stepping motor including two phase coils 13a and 13b, each of which has a lead wire extended from a center tap. Phase currents to be supplied to the phase coils 13a and 13b are generated by a pair of phase current generators 30a and 30b which are shown in the center portion of FIG. 1 and which have the same arrangement. The phase currents are supplied through reactance selection circuits 50a and 50b, respectively, to the phase coils 13a and 13b. AC current from an AC power source is rectified by a rectifier 8 and then the rectified current is supplied via a smoothing circuit 9 consisting of a resistor and a capacitor to the phase current generators 30a and 30b. A processor 20, which functions as vector position designation means and which is incorporated in the disc storage unit, is adapted to instruct phase current values which the phase current generators 30a and 30b must generate to the generators 30a and 30b through AND gates 41a and 42a, AND gates 41b and 42b and PWM circuits 43a and 43b arranged between the processor 20 and the generators 30a and 30b, respectively.

As will be described in more detail below, each of the phase current generators 30a and 30b can be a sort of switching circuit receiving positive or negative current from the above-mentioned DC power supply 8, 9. The generators 30a and 30b generate clockwise phase currents when they receive the outputs from the respective AND gates 41a and 41b, and generate counterclockwise phase currents when they receive the outputs from the respective AND gates 42a and 42b.

In this embodiment, the value of the phase current designated by the processor 20 is determined by a two-bit designation value DS and a four-bit designation value VS. The designation value DS designates the positive or negative direction of the phase current or zero value. For instance, when the designation value DS is, for instance, (0,1), the phase current is caused to flow in the clockwise direction. When the designation value DS is (1,0), the phase current is caused to flow in the counterclockwise direction. When the value is (0,0) or (1,1), the value of the phase current becomes zero. The value VS is determined by 16 values 0-15 of the PWM phase current represented by four bits as described above with reference to FIG. 6E. When the PWM circuits 43a and 43b receive the values VS to deliver PWM signals, each has a waveform as shown in the frame in FIG. 6E. In this embodiment, the AND gates 41a, 41b, 42a and 42b are shown as three-input AND gates having one complementary input terminal. When the AND gates 41a, 41b, 42a and 42b receive the designation values DS and the PWM signals from the PWM circuits 43a and 43b, the AND gates which are selected to flow the current in the clockwise or counterclockwise direction in the manner described above are opened only during the time that the PWM signal is "ON", so that the PWM signal from the PWM circuit 43a or 43b is applied to the phase current generator 30a or 30b. The AND gates 41a and 42a, and the AND gates 41b and 42b are so interlocked that the AND gates 41a and 42b or 41b and 42b are prevented from being opened simultaneously, and when the designation value DS is (0,0) or (1,1), all the AND gates are closed.

Figure 2:
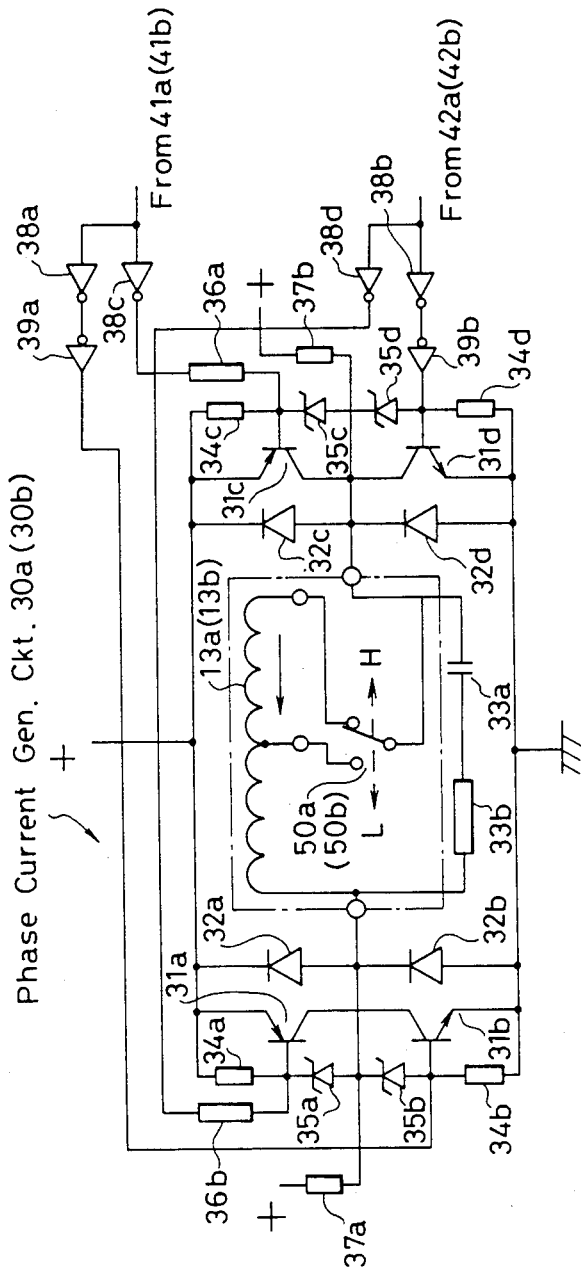
FIG. 2 is a circuit diagram showing a detailed embodiment of the phase current generator shown in FIG. 1 and a detailed embodiment of the phase coil and reactance selection circuit shown in FIG. 1.

FIG. 2 shows a detailed embodiment of the circuit of the phase current generator 30a or 30b which is schematically shown in FIG. 1 and the phase coil 13a (13b) and a reactance selection circuit 50a (50b) are shown in the center portion of FIG. 2 for the sake of easy understanding. The main components of the phase current generator 30a (30b) are transistors 31a–31d interconnected in the form of a bridge. In response to the output derived from the AND gate 41a (41b), the transistors 31b and 31c are simultaneously turned on, so that a phase current in one direction is caused to flow through the phase coil 13a (13b) as indicated by the arrow. In response to the output from the AND gate 42a (42b), both the transistors 31a and 31d are simultaneously turned on, so that the phase current in the opposite direction is caused to flow through the phase coil 13a (13b) in the direction opposite to that indicated by the arrow. Four diodes 32a–32d connected between the collectors and the emitters of the respective transistors 31a–31d function as a freewheeling circuit. Resistors 34a–34d connected between the bases and the emitters of the respective transistors 31a–31d and Zener diodes 35a–35d connected between the collectors and the bases of the respective transistors 31a–31d determine their base potentials. An intermediate voltage from a voltage source is applied through respective resistors 37a and 37b to the junction point between the two Zener diodes 35a and 35b and the two Zener diodes 35c and 35d, respectively, so as to determine the voltage applied to the transistors 31a and 31b and the transistors 31c and 31d, respectively. The outputs from the AND gates 41a (41b) and 42a (42b) are applied to the bases of the transistors 31a–31d through inverters 38a and 39b and through inverters 38b and 39b or through an inverter 38c and a resistor 36a and through an inverter 38d and a resistor 36b in the form of an intercrossing connection. A series circuit consisting of an overvoltage suppressing capacitor 33a and a resistor 33b is connected between the junction point between the collectors of the transistors 31a and 31b and the junction point between the collectors of the transistors 31c and 31d.

In this embodiment, the phase coil 13a (13b) to which the phase current generated by the phase current generator 30a (30b) is supplied has the lead wire extended from the center tap of the phase coil 13a (13b). The phase current is selectively supplied either to the center tap or the lead wire extended from the right end of the phase coil 13a via a reactance selection circuit 50a (50b) consisting of one selector switch in this embodiment. When the reactance selection circuit 50a (50b) is in the switched state as shown in FIG. 2, the phase current flows entirely through the phase coil 13a (13b), so that its reactance has a high value H. On the other hand, when the reactance selection circuit 50a (50b) is switched to the opposite switched state, the phase current flows through only one half of the phase coil 13a (13b), so that its reactance has a low value L.

In general, the position of the center tap may be selected arbitrarily. Even though it is preferable that the ratio H/L is higher in the present invention, there may be a case in which the above-mentioned ratio cannot be freely selected depending upon the type of the head control motor 10, so that it is simple and satisfactory in practice to select the position of the center tap at which the above-mentioned ratio becomes 2.

Figure 3:
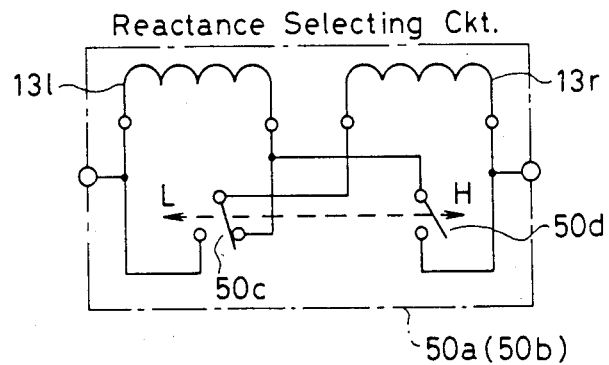
FIG. 3 is a circuit diagram showing another embodiment of the phase coil and reactance selection circuit.

FIG. 3 shows another embodiment of the reactance selection circuit 50a (50b) which corresponds to the portion surrounded by the dash-and-dotted line in FIG. 2. In this embodiment, the phase current 13a (13b) is divided into two phase coil sections 13l and 13r which are equal in length and construction. Four lead wires are extended from the phase coil 13a (13b) thus divided and are selected to form a series circuit or a parallel circuit by the reactance selection circuit 50a (50b) consisting of one selector switch 50c and one switch 50d. It is easily understood that the high-low ratio H/L becomes 4 in the circuit shown in FIG. 3.

In general, in response to the switching of the reactance by the reaction selection circuit 50a (50b), the value of the product of the phase current and the number of turns of the phase coil is varied. In the case of the reactance selection switch shown in FIG. 2, the ratio of the product of the phase current and the number of turns of the phase coil is equal to the reactance ratio H/L, while in the case of the embodiment shown in FIG. 3, even if the value of the reactance is varied, the value of the product of the phase current and the number of turns of the phase coil remains unchanged, both under the condition that the phase current generated by the phase current generator 30a (30b) remains unchanged. The above-described facts are applicable only to the case where the phase current generator 30a (30b) is an ideal constant current power supply and accordingly vary depending upon the characteristics of the phase current generator 30a (30b) combined with the above-mentioned rectifier 8 and the smoothing circuit 9. The value of the product of the phase current and the number of turns of the phase coil 13a (13b) at the time that the head 3 is maintained at its normal position can be suitably adjusted by the above-mentioned designation value in accordance with such characteristics.

Figure 4:
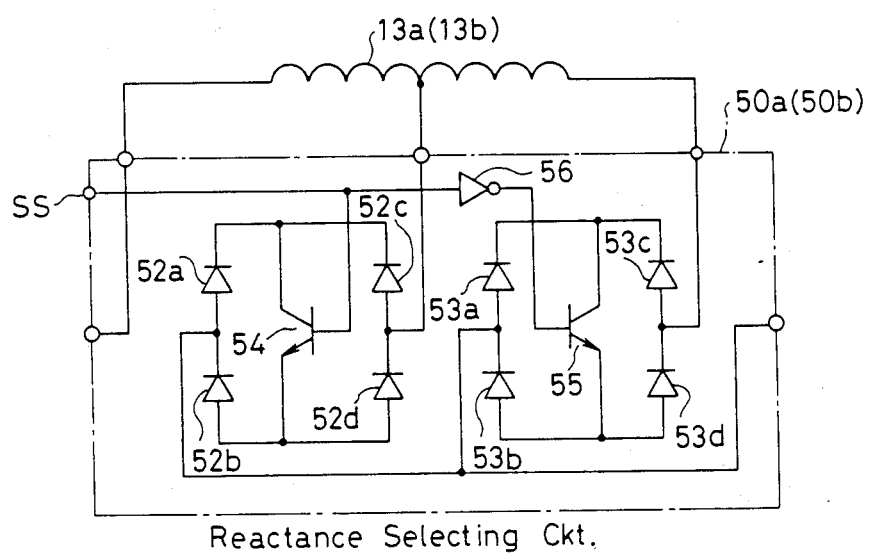
FIG. 4 is a circuit diagram showing a detailed embodiment of a reactance selection circuit shown in FIG. 1.

FIG. 4 shows an embodiment of a detailed circuit of the reactance selection circuit 50a (50b) corresponding to that shown in FIG. 2. In this embodiment, one selector switch as the reactance selection circuit 50a (50b) in FIG. 2 consists of two selector switches, each consisting of a bridge circuit having four diodes 52a–52d (53a–53d) and one transistor 54 (55). The respective collectors of the transistors 54 and 55 are connected to the junction points between the diodes 52a and 52c and between the diodes 53a and 53c, and the respective emitters of the transistors 54 and 55 are connected to the junction points between the diodes 52b and 52d and between the diodes 53b and 53d. That is, the respective collectors and the emitters of the transistors 54 and 55 are connected between DC terminal pairs of the bridge circuits. The junction points between the diodes 52a and 52b and between 53a and 53b; that is, one of the AC terminal pairs of the bridge circuits, are connected in common and further connected to the phase current generator 30a (30b). The junction point between the diodes 52c and 52d; that is, the other of the AC terminal pair is connected to the center tap, and the junction point between the diodes 53c and 53d; that is, the other of the AC terminal pair is connected to the lead wire extended from the right end of the phase coil 13a (13b). A switching signal SS is directly applied to the base of the transistor 54 and is also applied to the base of the transistor 55 through an inverter 56. Therefore, the transistors 54 and 55 are complementarily interlocked so that when the switching signal SS is at "1" level, the switching circuit including the transistor 54 is turned on, and when the switching signal SS changes to "0" level, the switching circuit including the transistor 55 is turned on.

Figure 6A:
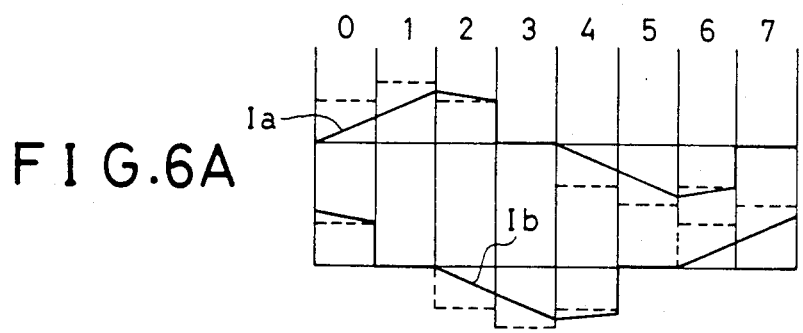
FIGS. 6A-6E are explanatory diagrams used to explain a prior art head position control system and a head position control system in accordance with the present invention.
Figure 6B:
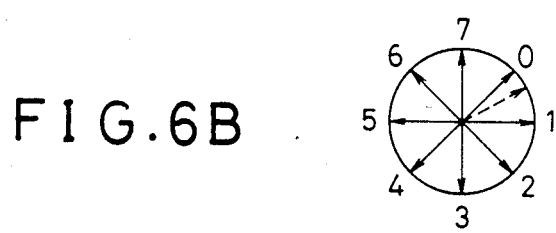

The whole operation carried out by the system in accordance with the present invention described above will be described with reference to the flow chart shown in FIG. 5. A flow of the control procedure shown in FIG. 5 is viewed from the side of the processor 20 which functions as means for designating the position of a vector. The flow starts when a seek command for moving the head 3 to a desired track on the surface of the disc 1 is issued from the disc storage unit. In this case, it is assumed that the number m of the reference vector positions which are shown in FIG. 6B and by way of which the head control motor passes while the head is moving is given simultaneously with the occurrence of the seek command.

Figure 6C:
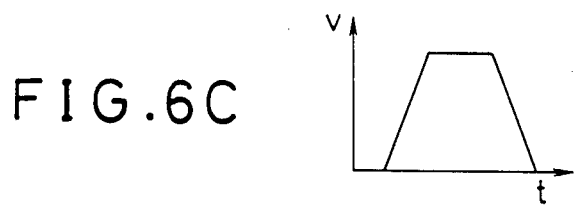
Figure 6D:
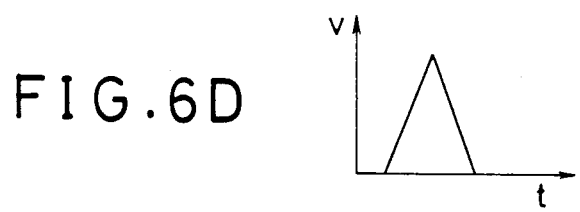
Figure 6E:

In first step S1, the processor 20 outputs the switching signal SS="1" through the output port 21 thereof to the reactance selection circuits 50a and 50b, so that the transistor 54 is turned on and consequently the phase coils 13a and 13b of the head control motor 10 are rendered to have a low reactance. In next step S2, 1 is selected as an auxiliary variable i, and then in step S3 the designation values DS and VS are generated, so that the head control motor 10 starts rotating. In accordance with the value of the variable i, the designation value DS is given so that the vector positions shown in FIG. 6B rotate in the counterclockwise direction or in the clockwise direction sequentially. Because the designation value VS designates a value of the phase current, the vector position may be displaced to draw a circular path in accordance with the variable i, but in the simplest process, the vector position may be displaced to draw a rectangular path while the variable i is fixed. In practice, the timing of switching the designation value DS is varied in accordance with the variable i so that the speed of the head 3 varies as shown in FIG. 6C or 6D. In FIG. 5, this procedure is typically shown in step S3 in a simplified manner.

The operation of stepping up the value i of the variable through steps 4 and 5 and returning the stepped-up variable i to step S3 is repeated. When the variable i reaches m so that the head 3 is placed on the desired track, the operation leaves the loop and enters step S6. As a result of such repeated operations of the sequential steps, the reactance of the phase coils or of the head control motor 10 can be always maintained at a low value, so that a high speed response in the operation of the head control motor 10 can be ensured.

The steps after step S6 are carried out in order to correct the head position and to hold the head at its normal position. In step S6, the switching signal SS is changed to "0", and in response to SS="0", the reactances of the phase coils 13a and 13b of the head control motor 10 are switched to and maintained at a high level. Of course, the processor 20 delivers the designation values DS and VS corresponding to the condition in which the variable i becomes m.

In next step S7, while the phase current is maintained at the designated level, the processor 20 delivers the off-track amount detection command OS to the off-track amount detection circuit 7 so as to detect an off-track amount under this condition. More particularly, in response to the command OS, the off-track amount detection circuit 7 reads in the signal representative of servo information from the disc 1 through the read-/write circuit 6 in synchronism with the index pulse IDX and detects an off-track amount OT from the read out signal. The off-track amount OT is supplied to the input port 22 of the processor 20.

In step S8, the detected off-track amount is read out and in the succeeding step S9, it is determined whether the read-out off-track amount OT is within an allowance limit OTM or not. When OT<OTM, the program shifts to step S11. However, in general, such condition is not obtained from the beginning, so that the program usually shifts to succeeding step S10. In this case, in general, it is not needed to vary the designation value DS, so that in step S10, a value at which the off-track amount can be made zero is given as the designation value VS. The designation value VS for carrying out such correction varies depending upon the type of the head control motor 10 and is stored in the processor 20 as a function of an off-track amount. Therefore, the stored value is read out in accordance with the detected off-track amount and is designated as the designation value VS.

Thereafter, the program returns from step S10 to step S8 and in step S9, the result of the correction control is evaluated. Steps S8, S9 and S10 are repeated until the off-track amount OT becomes within an allowance range OTM. In general, correction only once is sufficient and in step S11, the off-track amount detection command OS is deleted. Thus, the program is completed.

In previous step S6, "0" is as the switching signal SS, so that the phase coils 13a and 13b of the head control motor 10 are maintained at a high reactance value. Under this condition, the head 3 is maintained at its normal position during a succeeding read or write time.

Further, step S11 is not necessarily needed and may be eliminated. In this case, the off-track amount detection signal OS is always applied to the off-track amount detection circuit 7 during the read or write time, so that the detection of an off-track amount detected every one rotation of the disc 1 and the correction of the head position in accordance with the detected off-track amount can be continued.

As is clear from the above description, in the flow chart shown in FIG. 5, only steps S1 and S6 are required to carry out the present invention, so that the present invention applies little added burden to the software of the processor 20.

As described above, according to the present invention, lead wires are extended from the phase coils 13a and 13b of the head control motor 10 in a conventional head position control unit for a disc storage unit, so that their effective reactances may be varied and the reactance selection circuits 50a and 50b are additionally provided, so that the values of the reactances of the phase coils 13a and 13b of the head control motor 10 are switched to a low value by the reactance selection circuits 50a and 50b. The vector position is sequentially delivered to the phase current generators 30a and 30b by the processor 20 as means for designating the vector position, so that the head 3 is displaced to a desired position. Thereafter, the reactances of the phase coils 13a and 13b of the head control motor 10 are switched to a high value by the reactance selection circuits 50a and 50b, and then the vector position corresponding to the normal position of a vector is applied to the phase current generators 30a and 30b, so that the head 3 is so controlled as to be positioned at its normal position on a track provided on a disc and is maintained at this position. Therefore, during the time of displacement of the head 3 across the tracks, it is ensured that the head control motor 10 is driven at a high response speed.

In addition, it is ensured that the head is maintained at its normal position by utilizing the high reactances of the phase coils 13a and 13b which are optimum for maintaining the head 3 at its normal position or at the product of the phase current and the number of turns of the phase coil which are higher than those in the case of displacing the head 3. As is understood from the description of the embodiments of the present invention, high reactance values can be utilized to correct an off-track amount of the head 3 so that the head position correction control can be accomplished with a higher accuracy than with the conventional head control system.

According to the present invention, the control errors or failures can be eliminated during the displacement of the head 3, so that an off-track amount of the head upon completion of its displacement is very small and can be more accurately corrected as compared with the prior art head control system. As a result, the access time from the time that the displacement of the head 3 starts to the time that the head 3 is properly maintained at its normal position can be shortened as compared with the prior art system.

It may be considered at first glance that the driving torque during the displacement of the head 3 becomes lower as compared with the prior art system because the reactance values are low during the rotation of the head control motor 10, but according to the present invention, a high speed control response can be obtained, so that it is ensured that the driving torque is produced and is higher than that obtained by the prior art system. The torque for maintaining the head 3 at its normal position corresponds to that in the case in which the control speed is zero. In this sense, the holding torque is originally high. In addition, when the head 3 is maintained at its normal position, the reactance values and ampere-turns of the phase coils 13a and 13b are further increased, so that the holding torque is further increased.

What is claimed is:

1. A head position control system for a disc storage unit in which a read/write head reads out or writes information from or into a track of a plurality of tracks on a disc, comprising:

a poly-phase head control motor having phase coils, said motor being mechanically connected to said read/write head and having lead wires extending respectively from the phase coils thereof;

vector position designation means for designating the vector position of a composite vector on an electrical angle diagram defined by a plurality of phase currents flowing through said phase coils of said head control motor;

phase current generating means receiving a designation of said vector position from said vector position designation means and for outputting a plurality of phase currents having a current value corresponding to said designation;

reactance selection means receiving said phase currents from said phase current generating means, said reactance selection means selectively coupling said phase currents to selected lead wires of said phase coils to which said phase currents are supplied thereby switching the reactances of said phase coils between high and low reactance values;

means for instructing said reactance selection means to switch the reactances of said phase coils;

means responsive to said instructing means for displacing said read/write head to a desired position by sequentially indicating the vector position by said vector position designation means when the reactances of said phase coils of said head control motor are selected to be a low value by said reactance selection means; and means for controlling said head so that said head is brought to and maintained at a normal position on a track of said disc by instructing a vector position corresponding to a normal position of a vector to said phase current generating means from said vector position designation means when the reactances of said phase coils are switched to a high value by said reactance selection means.

2. A head position control system for a disc storage unit as claimed in claim 1, wherein the reactances of said phase coils are switched to said high value, so that the holding torque defined by the phase currents when said reactances are high is equal to or higher than the value of said holding torque when said reactances are low.

3. A head position control system for a disc storage unit as claimed in claim 1, wherein said lead wires are intermediate tap lines of said phase coils.

4. A head position control system for a coil storage unit as claimed in claim 3, wherein said intermediate tap lines are center tap lines.

5. A head position control system for a disc storage unit as claimed in claim 1, wherein said reactance selection means has two semiconductor switching circuits, each of which comprises bridge connection diodes connected between an AC terminal pair of said bridge so as to cause the phase current to flow therebetween and a transistor connected between a DC terminal pair of said bridge.

* * * * *